United States Patent [19]
Gee et al.

[11] Patent Number: 5,965,783
[45] Date of Patent: *Oct. 12, 1999

[54] PROCESS FOR ISOMERIZING OLEFINS

[75] Inventors: Jeffrey C. Gee, Kingwood, Tex.; Roger C. Williamson, Lewes, Del.; Christophe J. Lawrie, Kingwood, Tex.; Stephen J. Miller, San Francisco, Calif.

[73] Assignee: Chevron Chemical Company, San Ramon, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/759,771

[22] Filed: Dec. 3, 1996

Related U.S. Application Data

[63] Continuation-in-part of application No. 08/692,551, Aug. 6, 1996, abandoned, and application No. 08/716,119, Sep. 19, 1996, Pat. No. 5,741,759, which is a continuation of application No. 08/381,039, Jan. 31, 1995, abandoned, which is a continuation-in-part of application No. 08/190,404, Feb. 2, 1994, abandoned, said application No. 08/692,551, is a continuation of application No. 08/480,986, Jun. 7, 1995, Pat. No. 5,589,442, which is a continuation of application No. 08/190,405, Feb. 2, 1994, abandoned.

[51] Int. Cl.[6] .................................. C07C 5/25; C07C 5/27
[52] U.S. Cl. .......................... 585/664; 585/666; 585/667; 585/670; 585/671
[58] Field of Search .................................. 585/664, 666, 585/667, 670, 671

[56] References Cited

U.S. PATENT DOCUMENTS

| | | | |
|---|---|---|---|
| 4,650,917 | 3/1987 | Dessau et al. | 585/329 |
| 5,057,635 | 10/1991 | Gajda | 585/259 |
| 5,082,986 | 1/1992 | Miller | 585/667 |
| 5,107,050 | 4/1992 | Gaffney et al. | 585/671 |
| 5,132,484 | 7/1992 | Gajda | 585/667 |
| 5,146,035 | 9/1992 | Spehlmann et al. | 585/667 |
| 5,191,146 | 3/1993 | Gajda et al. | 585/667 |
| 5,254,789 | 10/1993 | Gajda | 585/671 |
| 5,292,984 | 3/1994 | Gajda et al. | 585/667 |
| 5,336,831 | 8/1994 | Gajda et al. | 585/667 |
| 5,365,008 | 11/1994 | Barger et al. | 585/667 |
| 5,367,101 | 11/1994 | Lawson et al. | 585/667 |
| 5,430,221 | 7/1995 | Gajda | 585/671 |
| 5,463,161 | 10/1995 | Gajda et al. | 585/671 |
| 5,510,306 | 4/1996 | Murray | 585/671 |

*Primary Examiner*—Elizabeth D Wood
*Attorney, Agent, or Firm*—Marianne H. Michel; W. Bradley Haymond

[57] ABSTRACT

A process for producing a synthetic hydrocarbon product is provided comprising contacting under isomerization conditions an olefin feed comprising linear olefins with a catalyst comprising an intermediate pore size molecular sieve, wherein the catalyst is substantially free of Group VIII metals. The synthetic hydrocarbon product exhibits a low pour point and low toxicity to marine life.

26 Claims, No Drawings

PROCESS FOR ISOMERIZING OLEFINS

CROSS-REFERENCE TO RELATED APPLICATIONS

This application is a continuation-in-part of U.S. Ser. No. 08/692,551 filed Aug. 6, 1996 and now abandoned, which is a continuation of U.S. Ser. No. 08/480,986 filed Jun. 7, 1995, now U.S. Pat. No. 5,589,442, which is a continuation of U.S. Ser. No. 08/190,405 filed Feb. 2, 1994 and now abandoned. This application is also a continuation-in-part of U.S. Ser. No. 08/716,119 filed Sep. 19, 1996, now U.S. Pat. No. 5,741,759, which is a continuation of U.S. Ser. No. 08/381,039 filed Jan. 31, 1995 and now abandoned, which is a continuation-in-part of U.S. Ser. No. 08/190,404, filed Feb. 2, 1994 and now abandoned.

FIELD OF THE INVENTION

This invention relates to an isomerization process for preparing a synthetic hydrocarbon.

BACKGROUND OF THE INVENTION

The preparation and use of synthetic hydrocarbons as drilling fluids and lube oils is known in the art. One method for preparing such hydrocarbons utilizes a boron trifluoride catalyst to oligomerize alpha-olefins. However, boron trifluoride is toxic and, upon contact with water or steam, produces toxic and corrosive fumes. Moreover, disposal of boron trifluoride residues presents an environmental problem.

Only a small fraction of the commercially available products of olefin oligomerization are useful in drilling fluids. Thus, the synthetic hydrocarbons are often in short supply and not readily available.

Many processes require rigorous reaction conditions. Such conditions can cause hydrocarbon cracking and oligomerization and require high energy consumption.

SUMMARY OF THE INVENTION

It is an object of the present invention to provide a process for preparing a synthetic hydrocarbon useful as a drilling fluid.

It is another object of the present invention to provide a process for preparing a synthetic hydrocarbon useful as a lube oil.

It is another object of the present invention to provide a process for preparing an environmentally safe synthetic hydrocarbon.

It is another object of the present invention to provide a simple process using mild conditions for preparing a synthetic hydrocarbon.

It is another object of the present invention to provide a process for controlling the amount of branching in a synthetic hydrocarbon by adjusting the reaction conditions.

It is another object of the present invention to provide a process where the properties of the synthetic hydrocarbons can be easily controlled by choice of olefin feed and isomerization process conditions.

According to the present invention, an isomerization process for preparing a synthetic hydrocarbon product is provided comprising contacting under isomerization conditions an olefin feed comprising linear olefins with an intermediate pore size molecular sieve which is substantially free of Group VIII metals.

DETAILED DESCRIPTION OF THE INVENTION

Although the term "comprising" is generally used in this specification, it is intended that this term, as used herein, encompass and include the terms "consisting essentially of" and "consisting of".

The present invention is a method of isomerizing an olefin feed with little or no feed cracking. The term "isomerization", as used herein, refers to both skeletal and double bond isomerization.

Prior applications U.S. Ser. No. 08/190,405 filed Feb. 2, 1994, U.S. Ser. No. 08/381,039 filed Jan. 31, 1995, and U.S. Ser. No. 08/190,404 filed Feb. 2, 1994 are incorporated herein by reference.

Suitable olefin feeds that can be used in the isomerization process for preparing synthetic hydrocarbons comprise linear olefins containing at least 8 carbon atoms and preferably at least 12 carbon atoms.

When the synthetic hydrocarbon is employed in a drilling fluid, preferred olefin feed comprises an olefin mixture comprising linear olefins containing from 12 to 40 carbon atoms, preferably from 12 to 24 carbon atoms, and more preferably from 14 to 18 carbon atoms.

When the synthetic hydrocarbon is employed as a lube oil, the preferred olefin feed comprises an olefin mixture comprising linear olefins containing at least 20 carbon atoms, preferably from 20 to 50 carbon atoms.

Preferably, the olefin feed contains greater than 50 weight percent linear olefins, more preferably, greater than 70 weight percent, and most preferably greater than 90 weight percent linear olefins. An especially preferred feed comprises normal alpha-olefins. The process can utilize olefins with either an odd or even number of carbon atoms. Although the olefin feed may contain components of only one carbon number, it is preferred that it contain components of two or more different carbon numbers.

A variety of catalysts can be used for skeletal isomerization. Preferred catalysts are molecular sieves having specific pore sizes and geometries. The catalysts are intermediate pore size molecular sieves and are substantially free of Group VIII metals, such as platinum and palladium.

The phrase "intermediate pore size", as used herein, means an effective pore aperture in the range of from about 5.3 to about 6.5 Å when the porous inorganic oxide is in the calcined form. Molecular sieves having pore apertures in this range tend to have unique molecular sieving characteristics. Unlike small pore zeolites such as erionite and chabazite, they will allow hydrocarbons having some branching into the molecular sieve void spaces. Unlike larger pore zeolites, such as the faujasites and mordenites, they can differentiate between n-alkanes and slightly branched alkanes, and larger branched alkanes having, for example, quaternary carbon atoms.

A preferred molecular sieve has generally oval, one-dimensional pores having a minor axis in the range of from about 4.2 Å to about 4.8 Å and a major axis in the range of from about 5.4 Å to about 7.0 Å.

Suitable catalysts include SAPO-11, SAPO-31, SAPO-41, SSZ-32, ZSM-22, ZSM-23 and ZSM-35. Such catalysts are disclosed in U.S. Pat. No. 5,246,566 to Miller, which is incorporated herein by reference. Additionally, SSZ-32 is described in U.S. Pat. No. 5,252,527 to Zones. ZSM-23 is described in U.S. Pat. No. 4,076,842 to Plank et al. Preferred SAPO's include SAPO-11, SAPO-31, and SAPO-41, which are described in U.S. Pat. No. 4,440,871 to Lok et al. ZSM-22 is described in U.S. Pat. No. 4,556,477 and ZSM-35 is described in U.S. Pat. Nos. 4,016,245 and 4,107,195. The full disclosure of these patents is incorporated herein by reference.

"Non-zeolite molecular sieves" are three-dimensional microporous crystalline structures containing [$AlO_2$] and [$PO_2$] oxide units. The non-zeolite molecular sieves may optionally contain silicon and/or one or more metals other than aluminum which will form oxide linkages in tetrahedral coordinates with aluminum and phosphorous in a crystalline framework. These non-zeolite molecular sieves are well known: for example, aluminophosphates are described in U.S. Pat. No. 4,310,440; silicoaluminophosphate molecular sieves comprising tetrahedrally-coordinated [$AlO_2$], [$PO_2$] and [$SiO_2$] structural units are described in U.S. Pat. Nos. 4,440,871; 4,943,424; and 5,087,347. Other useful non-zeolite molecular sieves comprise [$MO_2$], [$AlO_2$] and [$PO_2$] tetrahedrally-bound structural oxide units, where M represents at least one element which forms oxides in tetrahedral coordination with [$AlO_2$] and [$PO_2$] units. These are also well known: U.S. Pat. No. 4,567,029 describes non-zeolite molecular sieve where M is selected from the group consisting of magnesium, manganese, zinc, and cobalt; U.S. Pat. No. 4,913,799 describes non-zeolite molecular sieves where M is selected from the group consisting of arsenic, beryllium, boron, chromium, cobalt, gallium, germanium, iron, lithium, magnesium, manganese, silicon, titanium, vanadium, and zinc; and U.S. Pat. No. 4,973,785 describes non-zeolite molecular sieves comprising tetrahedrally-bound structural units comprising [$M'O_2$], [$SiO_2$], [$AlO_2$] and [$PO_2$] oxide units, where M' represents an element which forms oxides in tetrahedral coordination with [$AlO_2$] and [$PO_2$] units. The disclosures of each of the above-cited patents is incorporated herein by reference in their entirety.

Isomerization conditions can vary broadly and depend on the particular olefin feed employed and the desired synthetic hydrocarbon product. Generally, isomerization conditions are such that the resulting synthetic hydrocarbon product contains at least about 5 weight percent branched olefins, preferably 10 weight percent or greater branched olefins, and more preferably 15 weight percent or greater branched olefins.

When the olefin feed comprises normal alpha-olefins, generally, isomerization conditions are such that the resulting synthetic hydrocarbon contains less than 20 weight percent alpha-olefin, preferably less than 15 weight percent alpha-olefin, more preferably less than 10 weight percent, and most preferably less than 5 weight percent alpha-olefin.

The effective pore size of the molecular sieves can be measured using standard adsorption techniques and hydrocarbonaceous compounds of known minimum kinetic diameters. See Breck, *Zeolite Molecular Sieves,* 1974 (Chapter 8): Anderson et al., *J. Catalysis* 58, 114 (1979); and U.S. Pat. No. 4,440,871, the pertinent disclosures of which are incorporated herein by reference.

In performing adsorption measurements to determine pore size, standard techniques are used. It is convenient to consider a particular molecule as excluded if it does not reach at least 95% of its equilibrium adsorption value on the molecular sieve in less than about 10 minutes (p/po= 0.5:25°).

The amount of branching can be controlled by the temperature and weight hourly space velocity (WHSV) employed. Higher temperatures and lower WHSV produce increased amount of branching. The age of the catalyst also affects the amount of branching. As the catalyst ages, the temperature may need to be increased to obtain the same isomerization results.

Generally, the temperature will be in the range of from 100° C. to 400° C. and the WHSV will be in the range of from 0.2–10. The system is preferably operated at low pressure, for example, below 100 psig.

Preferred operating conditions, especially for making drilling fluids, are those which result in substantially no olefin cracking. By substantially no olefin cracking is meant very low yield loss, less than 10 weight percent of the olefin feed is cracked to products having fewer than 6 carbon atoms, preferably less than 5 weight percent, and more preferably less than 2 weight percent of the olefin feed is cracked. In a preferred embodiment, greater than 90 weight percent of the synthetic hydrocarbon product is within the boiling range of the olefin feed, preferably greater than 95 weight percent, and more preferably greater than 98 weight percent.

Isomerization can be readily conducted in a fixed bed low pressure reactor. However, other processing equipment known to those skilled in the art can be used.

The isomerization process results in a synthetic hydrocarbon product containing a mixture of branched olefin and linear olefins. It is desirable to minimize hydrocarbon cracking during isomerization, so the product preferably has about the same carbon number as the feed. Useful drilling fluids may comprise products derived from a single feed mixture, or a blend of products derived from a number of different feeds.

The branched synthetic hydrocarbon product has one or more methyl substituents bound to an otherwise linear hydrocarbon chain. With increasing amounts of branched product, it is more likely to have more than one methyl branch.

Synthetic Hydrocarbons in Drilling Fluids

As noted above, when the synthetic hydrocarbon is employed in a drilling fluid, preferred olefin feed comprises an olefin mixture comprising olefins containing at least 12 carbon atoms, preferably from 12 to 40 carbon atoms, more preferably from 12 to 24 carbon atoms, and most preferably from 14 to 18 carbon atoms. Preferred isomerization conditions include a temperature in the range of about 120° C. to about 220° C.

The present process produces a synthetic hydrocarbon which contains both linear and branched hydrocarbons, where the branched hydrocarbons contain methyl substituents. Prior art polyalpha-olefins are oligomerization products which are highly branched with substituent groups which are larger than methyl groups.

The synthetic hydrocarbons of this invention can be hydrogenated to achieve complete or partial saturation. However, the unhydrogenated hydrocarbons are preferred.

Synthetic hydrocarbons used in drilling fluids, especially offshore, exhibit five important properties. These are low pour point, low viscosity, acceptable flash point, lack of sheen, and minimal toxicity.

Generally, the synthetic hydrocarbons used in drilling fluids have a pour point below about 0° C. Preferably, the synthetic hydrocarbon has a pour point below about –5° C. and remains homogenous after standing at –5° C. for at least one week. More preferably, the pour point is below about –9° C.

The derived kinematic viscosity of the drilling fluid is an important parameter since, if it is too low, the drilling fluid will not perform its function of suspending the cuttings and bringing them to the surface; however, if it is too high, pumping of the drilling fluid will not be facile. While the derived kinematic viscosity of the drilling fluid can be controlled by additives, the viscosity of the synthetic hydrocarbon is a primary factor. For that reason, the kinematic viscosity of the synthetic hydrocarbon should be, broadly, in the range of 0.5 to 5 centistokes (cSt) at 100° C. More preferably, the kinematic viscosity is between 1 to 3 cSt, and, most preferably, is between 1.3 to 1.7 cSt at 100° C.

Another important property for the synthetic hydrocarbon is that it has a relatively high flash point for safety reasons. Preferably, the flash point is above 90° C. A flash point above 110° C. is more preferred.

Another desirable property for the synthetic hydrocarbon used in drilling fluids is that it not produce a sheen when added to water. Unlike diesel fuels and other oils previously used in drilling fluid, the synthetic hydrocarbons of this invention produce no sheen and thus fulfill this requirement.

Additionally, the synthetic hydrocarbons of this invention are minimally toxic to marine and animal life. As drilling fluids, they exhibit minimal toxicity as determined by a Mysid shrimp (Mysidopsis bahia) bioassay specified by the United States Environmental Protection Agency (EPA). Generally, the drilling fluid exhibits an LC50 of greater than 30,000 ppm and preferably greater than 100,000 ppm.

Conventional oil-based drilling fluids exhibit substantial toxicity to marine life and therefore the cuttings from drilling operations with such fluids cannot currently be disposed of offshore, necessitating costly transport to shore and disposal in onshore hazardous waste facilities. In contrast, the drilling fluid of this invention exhibits minimal toxicity to marine life, as evidenced by the excellent survival rates of Mysid shrimp exposed to the drilling fluid in bioassays conducted according to the Protocol specified by the United States Environmental Protection Agency.

The drilling fluids can be modified according to the end use of the fluid using suitable weight materials, emulsifiers, wetting agents, viscosifiers, densifiers, fluid-loss additives, and the like.

The drilling fluid comprises a mixture of internal linear and skeletally-isomerized methyl-substituted olefins as the synthetic hydrocarbon phase. Generally, the synthetic hydrocarbon comprises at least 30 weight percent by volume of the drilling fluid, preferably between about 50 to 70 volume percent.

The aqueous phase comprises up to 70 weight percent by volume of the composition. The aqueous phase may be either fresh water or aqueous solutions containing salts such as sodium chloride, potassium chloride, calcium chloride, and combinations thereof. The salts function as a densifier and emulsion stabilizer, and also serve to protect salt formations from dissolution in the drilling fluid.

If the drilling fluid is formulated with a significant water content, the aqueous phase is preferably dispersed within the nonaqueous phase to form an emulsion. In the absence of mechanical agitation, such emulsions are generally unstable; so surfactants or emulsifiers are commonly added. Useful examples of surfactants include anionic surfactants such as the di- and trivalent metal salts of fatty acids; other useful surfactants are well known to those skilled in the art of drilling fluid formulation. The emulsion can be further stabilized by adding macromolecular surfactants. These include the polyamide class of emulsifiers manufactured by the reaction of polyamines with the combination of fatty acids and dibasic acids such as maleic and fumaric acids.

The density of the drilling fluid can be adjusted by adding a weight material. It is often desirable to increase the drilling fluid density to prevent collapse of the formation into the bore-hole. Weight materials are well known in the art and include, but are not limited to: barium sulfate, calcium carbonate, iron oxide, and the like. To avoid the weight material settling out of high density drilling fluid compositions, it is often desirable to add a wetting agent. The emulsion stabilizing surfactants described above will serve this function also; however, other wetting agents can be added, if desired. These can include polyethoxylated alkylphenols, polyethoxylated alcohols, or polyethoxylated polyol fatty acid esters.

The suspending properties of the drilling fluid can be improved by adding a gellant or viscosifier. A commonly used viscosifier is an amine-treated clay. The clay will also impart some desirable filtration control properties. If further fluid loss control is desired, other additives such as organophilic lignites, blown asphalt, uintaite or other polymeric materials that will line the bore-hole can be used.

Other hydrocarbons, such as those described in U.S. Pat. No. 5,096,883 and/or U.S. Pat. No. 5,189,012, may be blended with the synthetic hydrocarbon of this invention provided that the final blend has the necessary pour point, kinematic viscosity, flash point, and toxicity properties to function as the continuous phase of a synthetic hydrocarbon based drilling fluid.

The synthetic hydrocarbon of this invention can be used to prepare an emulsion with excellent high temperature stability. Indeed, the drilling fluid of this invention exhibited better high temperature stability when compared to a drilling fluid prepared from a commercial 2 cSt polyalpha-olefin (PAO) synthetic hydrocarbon. Additionally, functional suspending properties of the products are indicated by the high yield points and acceptable gel strengths. Moreover, the fluid loss properties are good, even in the absence of a fluid loss additive.

Moreover, the derived viscosity of the fluid is also lower, indicating that the drilling fluid of this invention offers a faster drilling fluid. The present inventors also contemplate that, alternatively, a drilling fluid of similar derived viscosity to that prepared using the commercial PAO could be prepared by using a lower synthetic hydrocarbon to water ratio, thus offering a more economical drilling fluid.

Higher Molecular Weight Fluids/Lube Oils

The Group VIII metal-free intermediate pore size molecular sieve catalysts described above, especially the SAPO catalysts such as SAPO-11, can also be used to skeletally isomerize $C_{20}+$ olefins, and thereby significantly reduce the pour point of these hydrocarbons.

For lube oil use, the $C_{20}+$ olefin product preferably contains at least 10 weight percent skeletally isomerized olefin, preferably at least 50 weight percent, and more preferably at least 90 weight percent.

Isomerization conditions depend on the feed and the desired product pour point. For producing lube oils, the temperature is generally from about 200° C. to 400° C. The pressure is typically from about 15 psig to about 2000 psig, preferably from about 15 psig to about 1000 psig, more preferably from about 15 psig to about 600 psig.

The liquid hourly space velocity (LHSV) is preferably from about 0.05 to about 20, more preferably from about 0.1 to about 5, most preferably from about 0.2 to about 2.0. Low pressure and low liquid hourly space velocity provide improved selectivity, thus resulting in more isomerization and less cracking of the feed and an increased yield.

The Group VIII metal-free catalyst used in the isomerization step provides selective conversion of waxy feed components to non-waxy components. During processing, skeletal isomerization of the oil occurs to reduce its pour point below that of the feed and form a lube oil which has a low pour point and excellent viscosity index. The selectivity of the intermediate pore size molecular sieve used in the isomerization step reduces the yield of low boiling product made by cracking, thereby preserving the economic value of the feedstock.

Optionally, the synthetic hydrocarbon is hydrogenated. After hydrogenation, which typically is a mild hydrofinishing step, the resulting lube oil product is highly paraffinic and has excellent lubricating properties. Hydrofinishing is done after isomerization.

Hydrofinishing is well known in the art and can be conducted at temperatures ranging from about 190° C. to about 340° C., at pressures of from about 400 psig to about 3000 psig, at space velocities (LHSV) of from about 0.1 to about 20, and hydrogen recycle rates of from about 400 to about 1500 SCF/bbl.

The hydrofinishing step is beneficial in preparing an acceptably stable lubricating oil. Lubricant oils which do not receive the hydrofinishing step tend to be unstable in air and light and tend to form sludges. The produced lube oil has a viscosity index (VI) ranging from about 120 to about 180 and a very low pour point, generally below −9° C., preferably below −15° C., and for certain applications even below −40° C.

The resulting synthetic hydrocarbon products containing higher molecular weight isomerized olefins have a variety of uses including their use as spotting fluids for drilling wells, intermediates for chemicals, e.g., by derivatization into functionalized hydrocarbons, etc. They are especially useful as lube oils, because of their low pour point and high viscosity index. Additionally, they have desirably low toxicity to marine and other animal life, so they are particularly useful in oil field applications.

The lube oil produced by the process of the invention can be used in automobiles. It has a low viscosity for its boiling range which results in less frictional resistance, less engine wear and increased fuel efficiency. The low viscosity and low pour point of the lube oil result in improved cold engine starting. Additionally, little or no viscosity index improver or pour point depressant is needed with these lube oils; thus, fewer performance-decreasing deposits are formed. Also, the high paraffinic nature of the lube oil gives it high oxidation and thermal stability, and the lube oil has a high boiling range for its viscosity, i.e., volatility is low, resulting in low evaporative losses.

The produced lube oil can be used as a blending component with other oils. For example, the lube oil can be used as a blending component with polyalpha-olefins, or with mineral oils to improve the viscosity and viscosity index properties of those oils, or can be combined with isomerized petroleum wax.

The synthetic hydrocarbons of this invention can also be used as workover fluids, packer fluids, coring fluids, completion fluids, and in other oil field and well-servicing applications. For example, they can be used as spotting fluids to unstick a drill pipe that has become stuck, or they can be used to replace part or all of the expensive polyalphaolefin lubricating additives in downhole applications. Additionally, they can also be used in drilling fluid formulations where shale-swelling inhibition is important, such as those described in U.S. Pat. No. 4,941,981 to Perricone et al.

The invention will be further described by the following examples. These examples are not intended to be limiting, in any way.

EXAMPLES

The degree of branching in the following examples was determined by hydrogenating the olefin product mixture to paraffins using a carbon-supported nickel catalyst at 210° C. and 1000 psi of hydrogen. The mixture of linear and branched paraffins was then analyzed by gas chromatography (GC) using a HP Ultra-1 boiling point column. The linear paraffin was assumed to have originated from linear olefins and the other paraffins from branched olefins. GC analysis indicated that most of the branched compounds were methyl alkenes. The position of this methyl group on the main chain appeared random. The percent alpha-olefin present was obtained by FTIR, unless otherwise indicated.

Example 1

Commercial 1-tetradecene was passed over a SAPO-11 catalyst that contained no Group VIII metal. The reactor temperature was 210° C., and the flow rate was 0.80 WHSV. FTIR showed the product to contain less than 3% residual alpha-olefin, and GC/FID of the hydrogenated product showed the product to consist of 90 weight percent branched olefins and 10 weight percent linear olefins.

Example 2

Commercial 1-hexadecene was passed over a SAPO-11 catalyst that contained no Group VIII metal. The reactor temperature was 185° C., and the flow rate was 0.53 WHSV. FTIR showed the product to contain less than 3 weight percent residual alpha-olefin, and GC/FID of the hydrogenated product showed the product to consist of 30 weight percent branched olefins and 70 weight percent linear olefins.

Example 3

A blend of 50 weight percent commercial 1-hexadecene and 50 weight percent commercial 1-octadecene was passed over a SAPO-11 catalyst that contained no Group VIII metal. The reactor temperature was 210° C., and the flow rate was 1.5 WHSV. FTIR showed the product to contain less than 1 weight percent residual alpha-olefin, and GC/FID of the hydrogenated product showed the product to consist of 48 weight percent branched olefins and 52 weight percent linear olefins.

Example 4

A blend of 50 weight percent commercial 1-hexadecene and 50 weight percent commercial 1-octadecene was passed over a SAPO-11 catalyst that contained no Group VIII metal. The reactor temperature was 150° C., and the flow rate was 1.5 WHSV. FTIR showed the product to contain less than 3 weight percent residual alpha-olefin, and GC/FID of the hydrogenated product showed the product to consist of 21 weight percent branched olefins and 79 weight percent linear olefins.

Example 5

A commercial C20/24 alpha-olefin was passed over a SAPO-11 catalyst that contained no Group VIII metal. The reactor temperature was 200° C., and the flow rate was 1.5 WHSV. FTIR showed the product to contain about 3 weight percent residual alpha-olefin, and GC/FID of the hydrogenated product showed the product to consist of 97 weight percent branched olefins and 3 weight percent linear olefins.

Example 6

Commercial 1-octadecene was passed over a SAPO-11 catalyst that contained no Group VIII metal. The reactor temperature was 200° C., and the flow rate was 1.5 WHSV. FTIR showed the product to contain less than 2 weight percent residual alpha-olefin, and GC/FID of the hydrogenated product showed the product to consist of 98 weight percent branched olefins and 2 weight percent linear olefins.

Example 7

Commercial 1-octadecene was passed over a SAPO-11 catalyst that contained no Group VIII metal. The reactor temperature was 150° C., and the flow rate was 1.5 WHSV. FTIR showed the product to contain less than 2 weight percent residual alpha-olefin, and GC/FID of the hydrogenated product showed the product to consist of 27 weight percent branched olefins and 73 weight percent linear olefins.

What is claimed is:

1. A process for producing a synthetic hydrocarbon drilling fluid product comprising contacting a linear alpha olefin feed, the olefins having at least 12 carbons and no more than 18 carbons, with a Group VIII metal-free, intermediate pore size molecular sieve catalyst under isomerization conditions including at a temperature between 100° C. and 400° C. such that the synthetic hydrocarbon product is unhydrogenated and is a mixture of branched and linear olefins with the mixture containing at least about 5 wt. % branched olefins and less than 20 wt. % alpha olefins.

2. The process of claim 1 wherein the isomerization conditions are such that the synthetic hydrocarbon product contains about 10 weight percent or greater branched olefins.

3. The process of claim 1 wherein the olefin feed comprises greater than 50 weight percent linear olefins.

4. The process of claim 3 wherein the olefin feed comprises greater than 70 weight percent linear olefins.

5. The process of claim 4 wherein the olefin feed comprises greater than 90 weight percent linear olefins.

6. The process of claim 3 wherein the olefin feed comprises alpha-olefins.

7. The process of claim 1 wherein the isomerization conditions are such that the synthetic hydrocarbon product contains less than 15 weight percent alpha-olefin.

8. The process of claim 7 wherein the isomerization conditions are such that the synthetic hydrocarbon product contains less than 10 weight percent alpha-olefin.

9. The process of claim 8 wherein the isomerization conditions are such that the synthetic hydrocarbon product contains less than 5 weight percent alpha-olefin.

10. The process of claim 1 wherein the isomerization conditions are such that the synthetic hydrocarbon product exhibits a pour point below 0° C.

11. The process of claim 10 wherein the isomerization conditions are such that the synthetic hydrocarbon product exhibits a pour point below −5° C.

12. The process of claim 11 wherein the isomerization conditions are such that the synthetic hydrocarbon product exhibits a pour point below −9° C.

13. The process of claim 1 wherein the isomerization conditions include a WHSV between 0.2 and 10.

14. The process of claim 1 wherein the isomerization conditions are such that the synthetic hydrocarbon product contains at least 10 weight percent branched olefins.

15. The process of claim 14 wherein the isomerization conditions are such that the synthetic hydrocarbon product contains at least 15 weight percent branched olefins.

16. The process of claim 1 wherein the isomerization conditions are such that substantially no olefin cracking occurs.

17. The process of claim 16 wherein the isomerization conditions are such that less than 10 weight percent of the olefin feed is cracked to products having fewer than 6 carbon atoms.

18. The process of claim 17 wherein the isomerization conditions are such that less than 5 weight percent of the olefin feed is cracked to products having fewer than 6 carbon atoms.

19. The process of claim 18 wherein the isomerization conditions are such that less than 2 weight percent of the olefin feed is cracked to products having fewer than 6 carbon atoms.

20. The process of claim 1 wherein the isomerization conditions are such that the synthetic hydrocarbon product contains at least 50 weight percent skeletally isomerized olefin.

21. The process of claim 20 wherein the isomerization conditions are such that the synthetic hydrocarbon product contains at least 90 weight percent skeletally isomerized olefin.

22. The process of claim 1 wherein the isomerization conditions are such that the synthetic hydrocarbon product exhibits a pour point below −15° C.

23. The process of claim 22 wherein the isomerization conditions are such that the synthetic hydrocarbon product exhibits a pour point below −40° C.

24. The process of claim 1 wherein the molecular sieve has generally oval, one-dimensional pores having a minor axis in the range of from about 4.2 Å to about 4.8 Å and a major axis in the range of from about 5.4 Å to about 7.0 Å.

25. The process of claim 1 wherein the molecular sieve is selected from the group consisting of SSZ-32, ZSM-23, ZSM-22, ZSM-35, SAPO-11, SAPO-31 and SAPO-41.

26. The process of claim 25 wherein the molecular sieve is SAPO-11.

* * * * *